US 012362664B2

(12) United States Patent
Castro Álvarez et al.

(10) Patent No.: US 12,362,664 B2
(45) Date of Patent: Jul. 15, 2025

(54) SERIES RESONANT POWER CONVERTER

(71) Applicant: Collins Aerospace Ireland, Limited, Cork (IE)

(72) Inventors: Ignacio Castro Álvarez, Gijón (ES); Grzegorz Popek, Birmingham (GB)

(73) Assignee: Collins Aerospace Ireland, Limited, Cork (IE)

( * ) Notice: Subject to any disclaimer, the term of this patent is extended or adjusted under 35 U.S.C. 154(b) by 0 days.

(21) Appl. No.: 18/227,132

(22) Filed: Jul. 27, 2023

(65) Prior Publication Data
US 2024/0039399 A1 Feb. 1, 2024

(30) Foreign Application Priority Data
Jul. 28, 2022 (EP) ..................... 22187621

(51) Int. Cl.
*H02M 3/00* (2006.01)
*H02M 1/00* (2006.01)
*H02M 3/335* (2006.01)

(52) U.S. Cl.
CPC ........... *H02M 3/01* (2021.05); *H02M 1/0058* (2021.05); *H02M 1/0074* (2021.05); *H02M 3/33571* (2021.05); *H02M 3/33573* (2021.05); *H02M 3/33592* (2013.01)

(58) Field of Classification Search
CPC .... H02M 3/01; H02M 1/0058; H02M 1/0074; H02M 3/33571; H02M 3/33573; H02M 3/33592; H02M 1/44; H02M 3/33569; H02M 3/33576; H02M 1/0077; Y02B 70/10

USPC ........................................................... 307/31
See application file for complete search history.

(56) References Cited

U.S. PATENT DOCUMENTS

| 6,344,979 | B1 | 2/2002 | Huang et al. |
| 8,792,254 | B2 | 7/2014 | Reddy |
| 10,819,242 | B2 | 10/2020 | Dai et al. |
| 11,025,172 | B2 | 6/2021 | Zhang et al. |
| 2012/0275197 | A1* | 11/2012 | Yan .................... H02M 3/33592 363/21.02 |
| 2016/0072388 | A1* | 3/2016 | Dubus ................. H02M 3/3376 363/25 |

(Continued)

FOREIGN PATENT DOCUMENTS

| CN | 103560674 A | 2/2014 |
| EP | 2262088 A1 | 12/2010 |

(Continued)

OTHER PUBLICATIONS

Extended European Search Report for European Patent Application N. 22187621.2, dated Jan. 17, 2023.

(Continued)

*Primary Examiner* — Richard Tan

(57) ABSTRACT

A series resonant power converter, comprising: a first plurality, m, of resonant power converter modules, each comprising a switching stage, a resonant tank, a transformer, a rectifier stage and an output capacitor, the plurality of resonant power converter modules connected in series across a power supply, the resonant power converter further comprising a common output stage (500) connected across the series-connected plurality of resonant power converter modules, whereby a second plurality, n, of output levels at the common output stage.

20 Claims, 5 Drawing Sheets

(56) References Cited

U.S. PATENT DOCUMENTS

2021/0351713 A1 11/2021 Garcia I Tormo et al.
2021/0408927 A1* 12/2021 Zhang .................. H02M 3/01

FOREIGN PATENT DOCUMENTS

| EP | 3934084 A1 | 1/2022 |
| KP | 2021147315 | 12/2021 |
| WO | WO-2010115713 A2 | 10/2010 |

OTHER PUBLICATIONS

Wu, T-F., et al.: "A PDM controlled series resonant multi-level converter applied for X-ray generators", Power Electronics Specialists Conference, 1999. PESC 99. 30th Annual I EEE Charleston, SC, USA Jun. 27-Jul. 1, 1999, Piscataway, NJ, USA, IEEE, US, vol. 2, Jun. 27, 1999 (Jun. 27, 1999), pp. 1177-1182, XP010346833, DOI: 10.1109/PESC.1999.785661, ISBN: 978-0-7803-5421-0.

Lu C., et al.: "Neutral-Point Voltage Balancing Methods of Series-Half-Bridge LLC Converter for Solid State Transformer", IEEE Transactions on Power Electronics, Institute of Electrical and Electronics Engineers, USA, vol. 36, No. 6, Nov. 2, 2020 (Nov. 2, 2020), pp. 7060-7073, XP011835512, ISSN: 0885-8993, DOI: 10.1109/TPEL.2020.3035150 (retrieved on Feb. 3, 2021).

Asa, E., et al.: "A novel multi-level phase-controlled resonant inverter with common mode capacitor for wireless EV chargers", 2015 IEEE Transportation Electrification Conference and Expo (ITEC), IEEE, Jun. 14, 2015 (Jun. 14, 2015), pp. 1-6, XP033180886, DOI: 10.1109/ITEC.2015.7165734 (retrieved on Jul. 23, 2015).

* cited by examiner

SERIES RESONANT POWER CONVERTER

CROSS REFERENCE TO RELATED APPLICATIONS

This application claims priority to and the benefit of European Patent Application No. 22187621.2 filed Jul. 28, 2022, the entire content of which is incorporated herein by reference.

TECHNICAL FIELD

The present disclosure relates to a series resonant power converter topology.

BACKGROUND

Power converters are used in many applications to provide an appropriate level of power to drive one or more loads from a power source. The power can be inverted, converted, stepped up or stepped down, as required to drive the loads in question. Typically, a power converter for loads such as electronic devices, electrical vehicles and other loads will include a DC-DC stage to derive appropriate DC drive voltage output levels for the loads to be driven. In recent times, DC power converter or power distribution systems have overtaken AC power distribution systems in many application e.g. in aircraft applications, especially as the trend has been to more electric aircraft (MEA) or all electric aircraft (AEA), due to their high efficiency and high power density (and thus lower weight and smaller size), among other things.

DC power distribution systems use a high voltage DC bus and the converter stage converts the high voltage bus into lower DC voltages for the loads to be driven. Higher and higher bus voltages are becoming possible in many applications, with the possibility of buses in e.g. aircraft applications increasing in the near future from 540 Vdc to 3 kVdc. For high power applications, there is a trend to increase the bus voltage to reduce overall losses in the system. As DC bus voltages increase, there is an advantage in multilevel and modular power converters that can be easily adapted to the increased bus voltage.

Conventionally, PWM power converters operating in switched-mode operation were used for DC-DC conversion. Such converters, however, due to having to switch their currents within the turn-on and turn-off times of the switches, caused undesirable voltage and current stresses, had poor conversion efficiency and reliability, and high switching losses.

More recently, and particularly with advances in semiconductor switching technology, resonant converters have been used to reduce switching losses and improve conversion efficiency. With resonant converters, the active switch device is switched with zero current or zero voltage at its terminals, thus significantly reducing switching losses.

There are two main types of resonant converter—the series resonant converter and the parallel resonant converter, having a resonant tank used to create lossless conditions for lossless turn-on and turn-off of the semiconductor switches. Generally, when the switching frequency is above the resonant frequency, the switches turn on at zero voltage or current condition which eliminates switching losses. To regulate the output voltage, the switching frequency is varied.

Although such resonant converters have many advantages, their high linearity between input voltage and output voltage means that if the input voltage varies over a wide range (in aircraft, for example, the input voltage range for a 540 Vdc bus may range from 400 to 750 Vdc) a high frequency variation is required to control the series resonant converter. The variable frequency penalises the overall design of the system, particularly the EMI filter.

There is a need for a series resonant power converter topology that enables simple and reliable control of the converter stage over a wide range of input voltages, with a reduced frequency range, whilst ensuring required grounding protection and galvanic isolation, where required.

SUMMARY

According to the disclosure, there is provided a series resonant power converter, comprising: a first plurality, m, of resonant power converter modules, each comprising a switching stage, a resonant tank, a transformer, a rectifier stage and an output capacitor, the plurality of resonant power converter modules connected in series across a power supply, the resonant power converter further comprising a common output stage connected across the series-connected plurality of resonant power converter modules, whereby a second plurality, n, of output levels is provided at the common output stage A power distribution system and control method are also provided as defined by the claims.

The topology and method of the disclosure enables adjustment of the input voltage to reduce the impact on frequency without requiring extra stages and ensuring optimal operation of the resonant tank.

BRIEF DESCRIPTION

Examples according to the disclosure will now be described with reference to the drawings. It should be noted that variations are possible within the scope of the claims.

DETAILED DESCRIPTION

Figure 1:
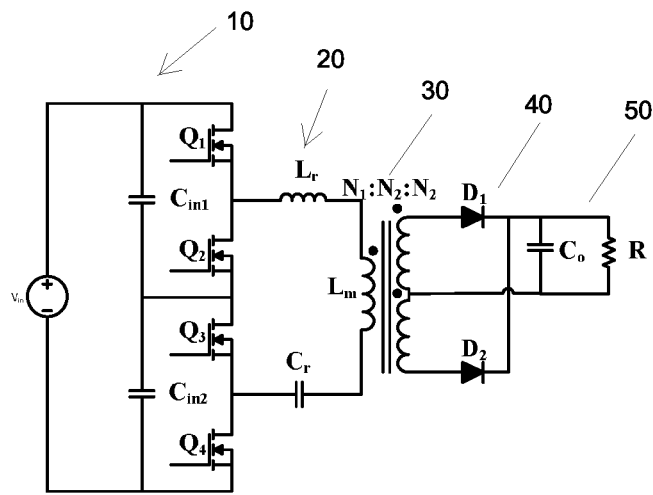
FIG. 1 shows a typical LLC resonant converter topology.

A DC-DC power converter generally consists of a DC distribution network including DC-DC converters and different DC loads having different power requirements. The DC converters implement voltage or current conversion to deliver the desired power to the loads. Various types of converter are known, but for many applications, resonant converters are preferred for the reasons discussed above. Resonant converters contain resonant networks including one or more inductors and one or more capacitors. Series resonant converters such as LLC power converters are used in various power source applications. A conventional LLC resonant converter for the DC-DC stage of a power converter is shown in FIG. 1 and includes a switching bridge 10, a resonant tank 20, here comprising a capacitor Cr and inductors Lr and Lm, a transformer 30, a rectifier 40 and a DC load output stage 50 with DC link capacitor Co and load R. The switching bridge comprises a number of series-connected semiconductor, e.g. MOSFET, switches Q1, Q2, Q3, Q4 connected across a DC Voltage bus $V_{in}$. In the example shown, the switching bridge is a full bridge rectifier, but other forms of bridge with different numbers of switching stages, e.g. a half-bridge rectifier, may also be used. The switching bridge, by switching the switches Q1, Q2, Q3, Q4 at a selected frequency by operation of a gate driver (not shown) will generate a square wave to excite the resonant tank 20.

In this example, the resonant tank is represented as a series connected resonant capacitor Cr and leakage inductance Lr. The resonant frequency of the tank is $f_r$, where:

$$f_r = \frac{1}{2\pi\sqrt{LrCr}}$$

The resonant tank 20 outputs a sinusoidal current from the input square wave.

The transformer 30 receives the sinusoidal current from the resonant tank 20 and scales the current and voltage according to the ratio n of turns of the transformer coils. The stepped-down current is then rectified by the synchronous rectifier 40. The DC output stage 50, represented here as a load capacitor $C_O$ and load resistor R, filters the rectified ac current to provide a DC output voltage.

The overall gain of the converter is equal to the product of the switching bridge gain, the resonant tank gain and the transformer ratio.

For a conventional LLC resonant converter as described above, the quality factor Q is dependent on the resonant frequency and inductance and the output power $P_o$ as well as the transformer ration and output voltage $V_o$ according to the equation:

$$Q = \frac{\pi^3 f_{rL_r} P_o}{4n^2 V_o^2}$$

The LLC three-level series resonant converter as shown in FIG. 1 can be modified as in EP 2 262 088 to reduce switching losses using flying capacitors connected in different configurations across the switches of the converter and to provide fractions of the full available input voltage as output voltages, so as to provide the possibility of a range of output voltages. The use of capacitors, however, adds to the overall cost and size/weight of the system.

The present disclosure provides a rectifier that provides a range of output voltages without the use of such flying capacitors whilst maintaining stability and minimising switching losses.

Figure 2:
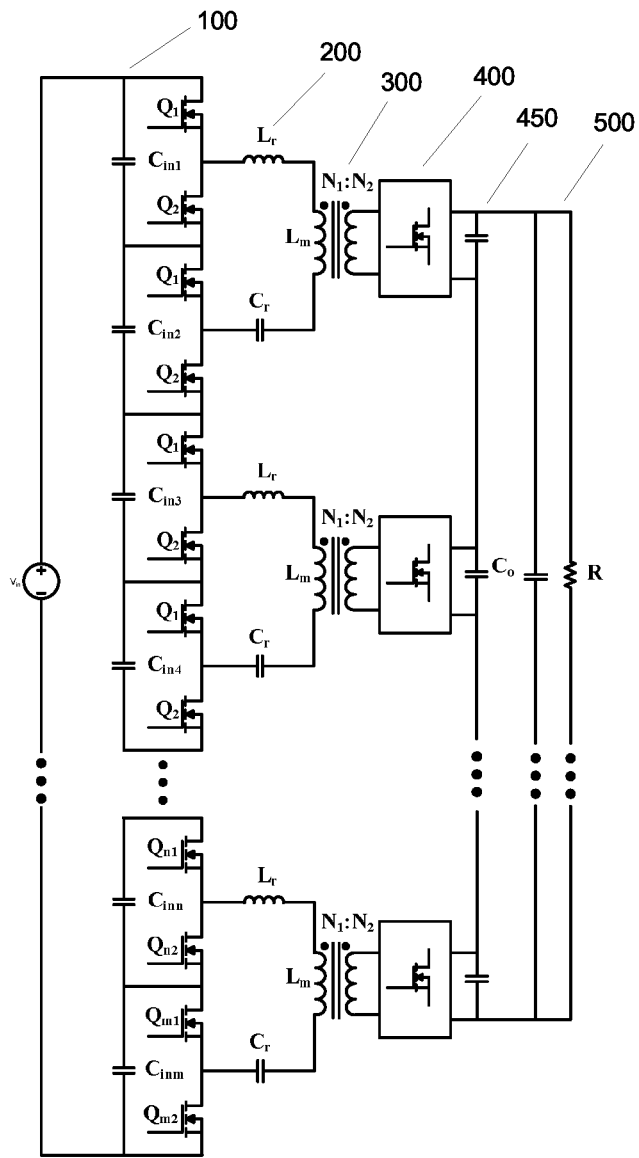
FIG. 2 shows a topology of an n-level series resonant converter according to the disclosure.

The topology according to the disclosure, as shown in FIG. 2, comprises n three-level series resonant converters e.g. LLC converters (although other resonant converters could be used). The topology therefore has a modular configuration which allows seamless utilisation of the capacitors while the output series allows the gain to be maintained during the operation of the converter, thus operating at the optimum soft-switching point to achieve zero current or zero voltage switching (ZCS/ZVS).

As will be described further below, the topology of this disclosure means that for different input voltages, the required stable output voltages can be provided without having to change the switching frequency, and thus avoiding the problems associated with varying switching frequency.

Figure 3:
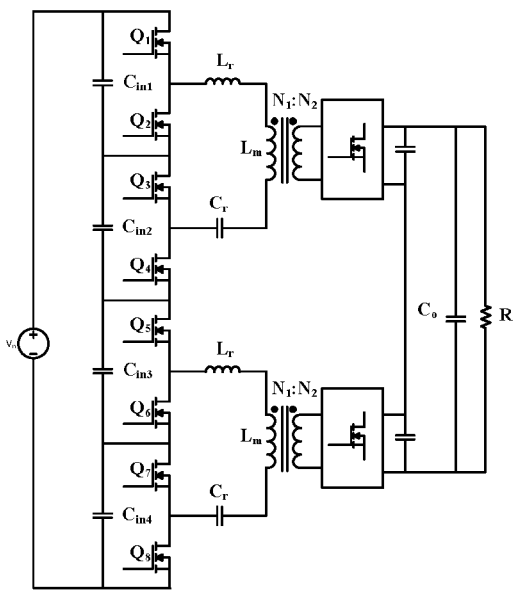
FIG. 3 shows the topology implemented as a 4-level series resonant converter.

Referring to FIG. 2, showing an n stage converter (i.e. for providing n different outputs, there is provided a plurality m of resonant converters having respectively m switching stages 100, m resonant tanks 200, m transformers 300, m solid state rectifiers 400, and m output capacitors 450. A common output stage 500, here represented as a capacitor and load resistor, is provided for all stages. In the example shown, as for the circuit of FIG. 1, each switching stage is a full-bridge rectifier. FIG. 3 shows an example where n=4. For a 4-level rectifier, m=2—i.e. the topology has two series resonant converters.

Figure 4:
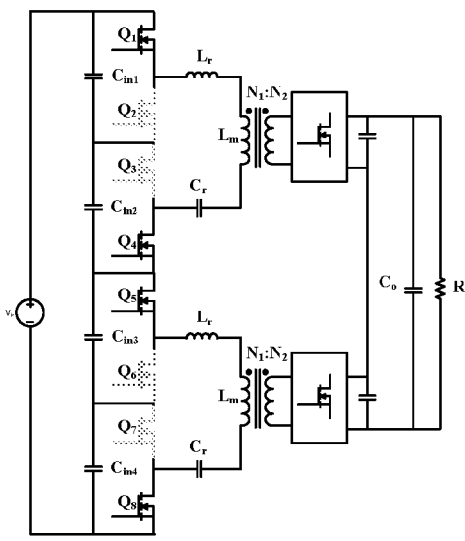
FIG. 4 illustrates a converter as shown in FIG. 3 operating in a first mode.
Figure 4:
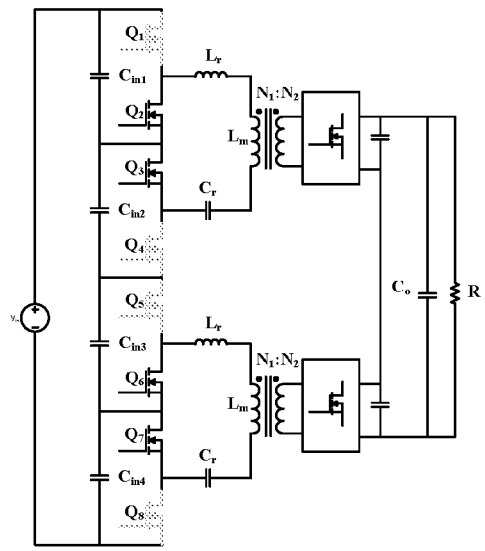

Operation of the example 4-level series resonant converter will be described with reference to FIGS. 4 to 7. In the example, there are four operating modes based on the input voltage from the bus. FIG. 4 shows a first operating mode. When switches Q1, Q4, Q5 and Q8 are ON, switches Q2, Q3, Q6 and Q7 are OFF and vice versa. Each switching bridge therefore applies half the input voltage to its input at any time. The input capacitors $C_{in1}$, $C_{in2}$, $C_{in3}$ and $C_{in4}$ are connected to and disconnected from their respective bridges. In this way, the full input voltage is provided at the output of the switching stage. This mode is used when the input voltage is the minimum of the input voltage range.

Figure 5:
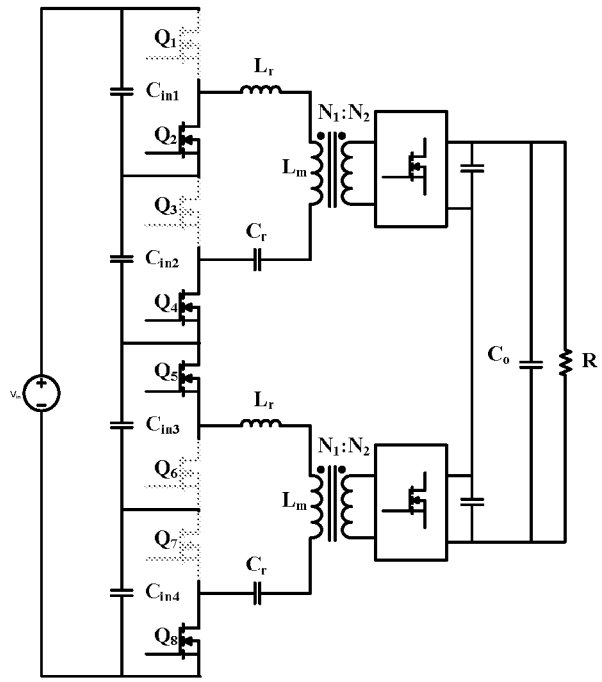
FIG. 5 illustrates a converter as shown in FIG. 3 operating in a second mode.

FIG. 5 shows the second mode of operation in which one of the series resonant converters (the top one in the Fig.) only connects one capacitor, while the other series resonant converter (the bottom one in the Fig.) connects both capacitors in the same way as for FIG. 4. The top resonant converter therefore provides a quarter of the input voltage, while the bottom resonant converter provides one half of the input voltage, and so together, they provide three-quarters of the input voltage. It should be noted that the switches rotate between the series resonant converters to ensure proper capacitor balance.

Figure 6:
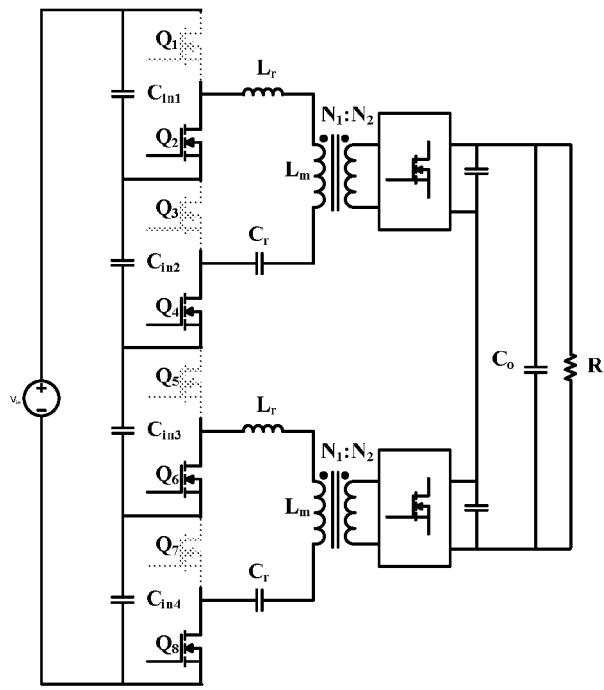
FIG. 6 illustrates a converter as shown in FIG. 3 operating in a third mode.

In the third mode of operation, illustrated in FIG. 6, both resonant converters only connect one capacitor and therefore each contributes a quarter of the input voltage and thus together provide half of Vin. This mode is used for higher input voltages.

Figure 7A:
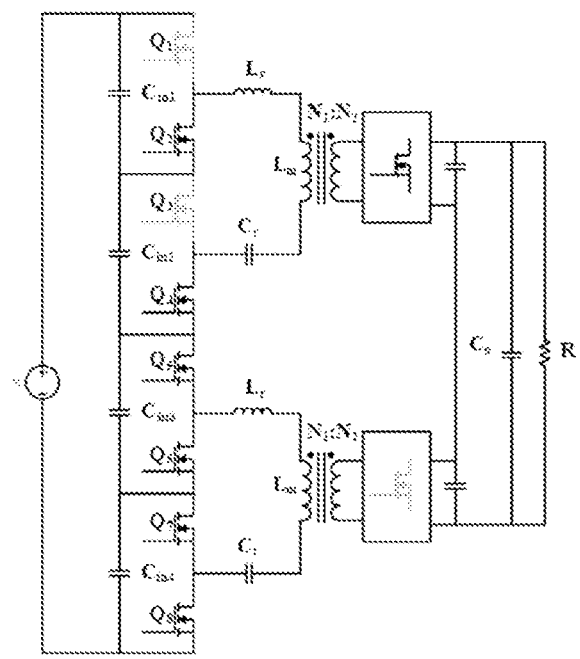
FIGS. 7A to 7D illustrate a converter as shown in FIG. 3 operating in a fourth mode.
Figure 7B:
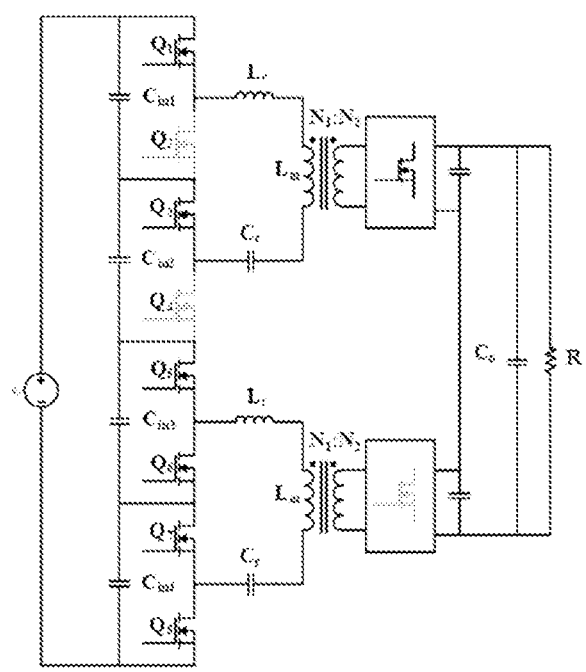
Figure 7C:
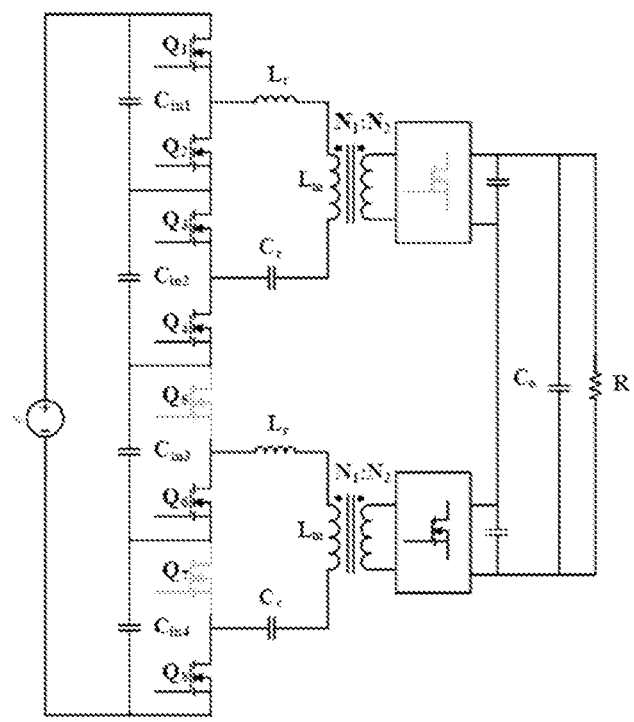
Figure 7D:
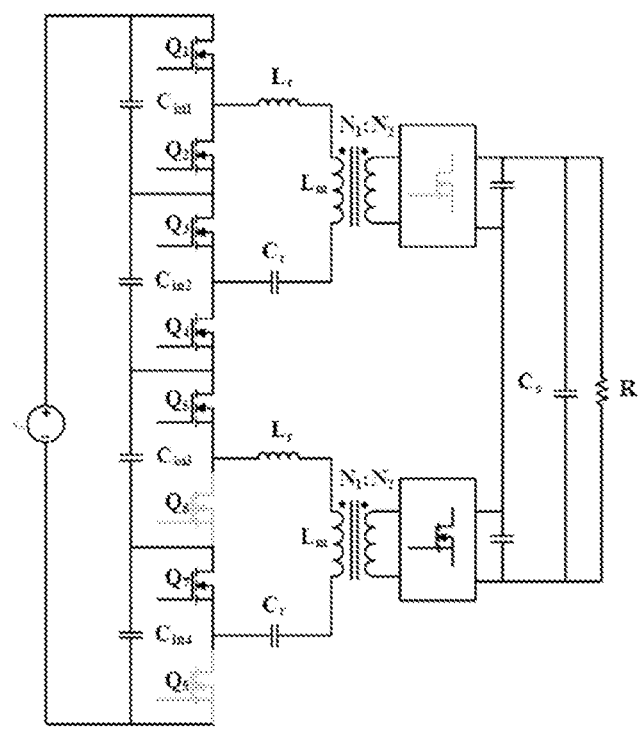

Finally, in the fourth mode of operation, shown in FIGS. 7A to 7B, one resonant converter is fully off (e.g. the bottom resonant converter in FIG. 7A) while the other has one capacitor connected and so provides a quarter of the input voltage. Again, the switches should be rotated to ensure proper capacitor balance. FIGS. 7A to 7D illustrate the rotation of the switches in the fourth mode in order to achieve voltage balance in the capacitors, where the light-shaded MOSFETS indicate conduction. In each of FIG. 7A to 7D, the MOSFET on the secondary side that is light-shaded represents the bridge that is shorted to ensure that the output of that bridge is zero and that the capacitor is discharged.

The control methodology for balancing the capacitors for the second and fourth modes can be relatively simple, only requiring the voltages on the capacitors to be measured and controlling the timing of the capacitor connection/disconnection accordingly.

The same approach can be applied to other n-level converters other than 4-level converters. It should be noted that as voltage is reduced at the primary side, current consumption increases, and the current remains constant on the secondary side. Current consumption is, however, typically low so, in practice, this is not really of concern.

Tests on the topology described have shown that frequency variation is reduced using this topology. In the tests performed, the frequency range was reduced by more than half at maximum load and even more at light loads. This reduction in frequency range can lead to improved EMI management and smaller EMI filter size. Further, there is a significant reduction on breakdown voltage for the switching devices which means that simpler less expensive solid state devices such as automotive-graded GaN or Si devices can be used for higher voltage e.g. aerospace applications. The modular configuration of the design means that the topology is flexible and can be easily reconfigured. The design maintains the advantages of low weight and small size and is particularly useful in aircraft power distribution systems.

The invention claimed is:

1. A series resonant power converter, comprising:
a plurality of resonant power converter modules, each resonant power converter module comprising a switching stage, a resonant tank, a transformer, a rectifier stage, and an output capacitor, the plurality of resonant power converter modules configured to be connected in series across a power supply; and
a common output stage connected across the plurality of resonant power converter modules, wherein the common output stage is configured to provide a plurality of output levels;
wherein, in a first operating mode, each resonant power converter module is configured to contribute a substantially equal portion of an input voltage to the common output stage;
wherein, in a second operating mode, different resonant power converter modules are configured to contribute different portions of the input voltage to the common output stage; and
wherein, in a third operating mode, at least one of the resonant power converter modules is configured to contribute a portion of the input voltage to the common output stage and at least one other of the resonant power converter modules is off.

2. The series resonant power converter of claim 1, wherein the series resonant power converter is configured to measure voltages of input capacitors of the switching stages and balance the input capacitors by controlling a timing of connection/disconnection of each input capacitor.

3. The series resonant power converter of claim 1, wherein each switching stage comprises four solid-state switches connected in series to form a full switching bridge.

4. The series resonant power converter of claim 1, wherein each switching stage comprises two solid-state switches connected in series to form a half switching bridge.

5. The series resonant power converter of claim 1, wherein each switching stage comprises MOSFETS or GaN switching devices.

6. The series resonant power converter of claim 1, wherein each resonant tank comprises an LC circuit.

7. The series resonant power converter of claim 1, wherein each rectifier stage is a solid state rectifier.

8. The series resonant power converter of claim 1, wherein the common output stage comprises a capacitor and a resistive load in parallel.

9. The series resonant power converter of claim 1, wherein the series resonant power converter comprises two resonant power converter modules and is configured to provide four output levels at the common output stage.

10. The series resonant power converter of claim 9, wherein:
in the first operating mode, each resonant power converter module is configured to contribute a half of the input voltage to the common output stage;
in the second operating mode, a first of the resonant power converter modules is configured to contribute a half of the input voltage to the common output stage and a second of the resonant power converter modules is configured to contribute a quarter of the input voltage to the common output stage;
in the third operating mode, the first of the resonant power converter modules is configured to contribute a quarter of the input voltage to the common output stage and the second of the resonant power converter modules is off; and
in a fourth operating mode, each resonant power converter module is configured to contribute a quarter of the input voltage to the common output stage.

11. A power distribution circuit comprising:
a power supply;
one or more loads configured to be provided with power from the power supply; and
a series resonant power converter as claimed in claim 1 and configured to convert power from the power supply to power for the one or more loads.

12. A method of operating a series resonant power converter to provide a plurality of different output voltage levels from a single input voltage supply, the method comprising:
providing a plurality of resonant power converter modules, each resonant power converter module comprising a switching stage, a resonant tank, a transformer, a rectifier stage, and an output capacitor, the plurality of resonant power converter modules connected in series across a power supply, the series resonant power converter further comprising a common output stage connected across the plurality of resonant power converter modules; and
controlling switching of the resonant power converter modules to provide a plurality of output levels at the common output stage;
wherein, in a first operating mode, controlling the switching of the resonant power converter modules comprises operating the switching stages such that each resonant power converter module contributes a substantially equal portion of an input voltage to the common output stage;
wherein, in a second operating mode, controlling the switching of the resonant power converter modules comprises operating the switching stages such that different resonant power converter modules contribute different portions of the input voltage to the common output stage; and
wherein, in a third operating mode, controlling the switching of the resonant power converter modules comprises operating the switching stages such that at least one of the resonant power converter modules contributes a portion of the input voltage to the common output stage and at least one other of the resonant power converter modules is off.

13. The method of claim 12, further comprising:
measuring voltages of input capacitors of the switching stages; and
balancing the input capacitors by controlling a timing of connection/disconnection of each input capacitor.

14. The method of claim 12, wherein:
the series resonant power converter comprises two resonant power converter modules; and
the series resonant power converter provides four output levels at the common output stage.

15. The method of claim 14, wherein:
in the first operating mode, each resonant power converter module contributes a half of the input voltage to the common output stage;
in the second operating mode, a first of the resonant power converter modules contributes a half of the input voltage to the common output stage and a second of the resonant power converter modules contributes a quarter of the input voltage to the common output stage;
in the third operating mode, the first of the resonant power converter modules contributes a quarter of the input voltage to the common output stage and the second of the resonant power converter modules is off; and
in a fourth operating mode, each resonant power converter module contributes a quarter of the input voltage to the common output stage.

16. The method of claim 12, wherein each switching stage comprises one of:
four solid-state switches connected in series to form a full switching bridge; or
two solid-state switches connected in series to form a half switching bridge.

17. The method of claim 12, wherein each switching stage comprises MOSFETS or GaN switching devices.

18. The method of claim 12, wherein each resonant tank comprises an LC circuit.

19. The method of claim 12, wherein each rectifier stage is a solid state rectifier.

20. The method of claim 12, wherein the common output stage comprises a capacitor and a resistive load in parallel.

* * * * *